United States Patent [19]

Ruggiero et al.

[11] Patent Number: 5,360,457
[45] Date of Patent: Nov. 1, 1994

[54] ENHANCED WETTING, LOW-FOAMING, DYE-LEVELING AGENT COMPRISING A PIPERAZINE SUBSTITUTED ORGANOSULFONATE

[75] Inventors: Murray A. Ruggiero, East Haven; Bruce A. Marien, Woodbridge; Shoaib Arif; Robert P. Roth, both of Cheshire, all of Conn.; Joseph T. Farrell; A. R. Vanover, both of Brandenburg, Ky.

[73] Assignee: Olin Corporation, Cheshire, Conn.

[21] Appl. No.: 189,369

[22] Filed: Jan. 31, 1994

[51] Int. Cl.$^5$ .............................................. C09B 67/00
[52] U.S. Cl. .............................................. 8/567; 8/137; 8/115.59; 8/594; 8/610; 252/545
[58] Field of Search ................. 8/137, 115.59, 594, 8/567, 610; 252/545

[56] References Cited

U.S. PATENT DOCUMENTS

| | | | |
|---|---|---|---|
| 3,264,242 | 8/1966 | Teot | 260/29.6 |
| 3,592,584 | 7/1971 | Link et al. | 8/26 |
| 3,634,272 | 1/1972 | Valenta et al. | 252/153 |
| 3,945,437 | 3/1976 | Chiu et al. | 166/305 R |
| 4,898,621 | 2/1990 | Pruehs et al. | 134/25.2 |
| 4,925,587 | 5/1990 | Schenker et al. | 252/174.22 |
| 5,030,245 | 7/1991 | Hemling et al. | 8/560 |
| 5,196,146 | 3/1993 | Farella et al. | 252/542 |
| 5,262,535 | 11/1993 | Kaiser | 544/402 |

Primary Examiner—Paul Lieberman
Assistant Examiner—Margaret Einsmann
Attorney, Agent, or Firm—Dale L. Carlson

[57] ABSTRACT

The present invention relates to an acid dye-leveling composition comprising a piperazine substituted organosulfonate that is useful for imparting a dye leveling characteristic to fibers prior to, or during, the fiber dyeing operation. Also described is a process for preparing the dye-leveling composition, as well as a process for using the composition in the dyeing of fibers. The composition is particularly useful for treating polyamide fibers, such as nylon, but is also suitably used in the treatment of silk, wool, and other synthetic and natural fibers.

14 Claims, No Drawings

ENHANCED WETTING, LOW-FOAMING, DYE-LEVELING AGENT COMPRISING A PIPERAZINE SUBSTITUTED ORGANOSULFONATE

FIELD OF THE INVENTION

The present invention relates generally to dye-leveling agents for fibers as well as cleaning agents and spot removers for fibers, and more specifically to a dye-leveling composition that provides advantageous fiber wetting during dye-leveling and/or cleaning of the fibers.

BACKGROUND OF THE INVENTION

A common problem encountered when dyeing natural and/or synthetic fibers, such as wool fibers or polyamide fibers, is the tendency of the dye to provide uneven coloration of the fiber. In essence, the dye more rapidly reacts at the point of initial contact with the fiber, thus giving an uneven appearance to the dyed fiber. This problem is accentuated when several dyes are utilized to produce a desired shading on the fiber. For example, the dyes may react at different rates to produce a separation of colors, causing a variation in shading at different points along the fiber and resulting in what is commonly referred to as "poor shade depth".

To alleviate the above problems, various materials have been suggested in the past to provide level fiber dyeing. These materials, commonly referred to as "dye-leveling agents", have in the past frequently contained anionic surfactants, such as alkyl diphenyloxide disulfonate. By way of illustration, alkyl diphenyloxide disulfonate has been used commercially as an acid dye-leveling agent. However, this disulfonate has the disadvantage of providing higher foaming and poorer wetting (as measured by a draves wetting test) than might be desired, as well as being limited in its usefulness to a relatively narrow pH range. In addition, as demonstrated in Comparative Example A, at column 8, lines 55–67 of U.S. Pat. No. 5,030,245, a dye-leveling agent consisting essentially of such an alkyl diphenyloxide disulfonate (which in that example was DOWFAX 2A1 alkyl diphenyloxide disulfonate, a product of Dow Chemical Company), did not result in a full dye shade development in the dyeing of nylon carpet. Further, alkyl diphenyloxide disulfonate surfactants such as DOWFAX 2A1 surfactant tend to contribute to poorer fiber wetting by the dye bath composition and higher foaming in the dye bath than otherwise might be desired. Accordingly, the search has continued for improved dye-leveling compositions that do not suffer from these poor wetting and high foaming problems.

The prior art is replete with various attempts to provide good dye-leveling agents to the carpet dyeing industry. By way of illustration, the above-mentioned '245 patent discloses a combination dye-leveling agent/-stainblocker comprising a polycarboxylated linear alcohol alkoxylate as the dye-leveling agent and a sulfonated phenol-formaldehyde diphenylsulfone condensate as the stainblocker, alone or together with an alkoxylated linear alcohol alkoxylate as a wetting agent. Although these compositions provide good dye-leveling in use with acid dyestuffs, there is still a need in the dyeing industry for further improvement.

As another illustration, U.S. Pat. No. 3,592,584 discloses a dyeing composition for polyamide fibers comprising a combination of a premetallized dye and a dyeing assistant selected from the group consisting of dodecylbenzene sulfonic acid, diethanolamine, and disodium dodecyldiphenylether disulfonate. However, these compositions have proved less effective in providing streak-free, even dyeings of fibers than might be desired.

New dye-leveling agents that are low in foaming and provide good fiber wetting, and are useful in facilitating level dyeing and good shade depth development during the fiber dyeing process, would be highly desired by the fiber dyeing community. If such new dye-leveling agents are usable in conjunction with a wide variety of dyestuffs for dyeing a variety of natural and synthetic fibers, such as wool, silk, and polyamide, these dye-leveling agents would be particularly advantageous to the fiber dyeing industry.

Heretofore, piperazine compounds have not been employed in any dye-leveling compositions for fibers to the knowledge of the present inventors, much less those compositions of the present invention, as described hereinbelow. Certain 2-piperazinones (which contain keto-substitution on the ring) are disclosed in compositions containing alkylated diphenyl oxide sulfonate surfactant, alone or in combination with a nonionic surfactant that may contain a mixture of ethoxylated and propoxylated alcohol, as taught in U.S. Pat. No. 5,196,146. The '146 patent focuses upon hard surface cleaner compositions for cleaning grease and oil from metal, plastic, and glass, all material that are not subject to the dye leveling problems encountered by the fiber dyeing industry. The present invention provides one solution to this dye leveling problem.

SUMMARY OF THE INVENTION

In one aspect, the present invention relates to a composition concentrate comprising:
(a) a piperazine-substituted organosulfonate,
(b) an organic or inorganic salt of a polycarboxylated alcohol alkoxylate, and
(c) an alcohol alkoxylate,
wherein the amount of component (a) is between about 20 and about 75 weight percent, component (b) is present in an amount of between about 2.5 and about 25 weight percent, and component (c) being between about 10 and about 75 weight percent, all weight percents being based upon the weight of said composition concentrate.

In another aspect, the present invention relates to a "working" composition comprising water and the abovedescribed concentrate, wherein said concentrate is present in said composition in an amount of between about 0.01 weight percent and about 20 weight percent, based upon the weight of said composition.

In yet another aspect, the present invention relates to a composition comprising:
(a) the reaction product of a piperazine compound (preferably 1,2-aminoethyl piperazine) and an alkyl diphenyl ether sulfonic acid,
(b) the reaction product of a base and a polycarboxylated linear alcohol alkoxylate acid, and
(c) a linear alcohol alkoxylate.

In still another aspect, the present invention relates to a composition useful for dyeing fibers comprising (a) a dye and (b) a dye-leveling agent comprising:
(1) the reaction product of 1,2-aminoethyl piperazine and an alkyl diphenyl ether sulfonic acid, (2) the reaction product of a base and a polycarboxylated linear alcohol alkoxylate acid, and
(3) a linear alcohol alkoxylate, said dye-leveling agent being present in a dye-leveling effective amount.

In yet another aspect, the present invention relates to a process for preparing a dye-leveling composition which comprises the steps of:
(a) reacting a piperazine compound selected from the group consisting of 1,2-aminoethyl piperazine, 1,4-piperazinediethane sulfonic acid, anhydrous piperazine, hydrated piperazine, and combinations thereof, with an aralkyl ether sulfonate to provide a piperazine-substituted aralkyl ether sulfonic acid,
(b) contacting said piperazine-substituted aralkyl ether sulfonic acid with a mixture comprising an alcohol alkoxylate and a polycarboxylated alcohol alkoxylate acid to provide a piperazine-containing mixture, and
(c) neutralizing at least a portion of said polycarboxylated alcohol alkoxylate acid in said piperazine-containing mixture with an organic or inorganic base in order to form a salt of said polycarboxylated alcohol alkoxylate.

In still another aspect, the present invention relates to a fiber cleaning composition comprising (a) a base fluid medium comprising water or an organic solvent, or a combination thereof, and (b) a cleaning agent comprising (and advantageously consisting essentially of):
(1) the reaction product of a piperazine compound (preferably 1,2-aminoethyl piperazine) and an alkyl diphenyl ether sulfonic acid,
(2) the reaction product of a base and a polycarboxylated linear alcohol alkoxylate acid, and
(3) a linear alcohol alkoxylate.

These and other aspects will become apparent upon reading the following detailed description of the invention.

DETAILED DESCRIPTION OF THE INVENTION

It has now been surprisingly found in accordance with the present invention that a dye-leveling composition comprising (and advantageously consisting essentially of) a multi-component mixture of anionic and nonionic surfactants provides extraordinary fiber surface wetting characteristics, as measured by draves wetting test values as compared to a commercial disulfonate dye leveling agent, namely Poly-Tergent ® 2A1 surfactant, and does not cause excessive foaming when incorporated into a dye-bath formulation. The multi-component mixture has surprisingly also been found to be useful as a cleaning agent when employed in fiber cleaning compositions.

The composition concentrate useful in the present invention suitably contains at least three significant components, namely component (a) a piperazine-substituted organosulfonate, component (b) an organic or inorganic salt of a polycarboxylated alcohol alkoxylate, and component (c), an alcohol alkoxylate. In addition, an optional defoamer is suitably employed if desired in order to minimize the likelihood of any foaming of the dyeing composition. The concentrate is suitably diluted to provide a "working composition" that lends itself for use either as a dye-leveling agent in a dye-bath formulation, or as a fiber cleaner suitable for use as a rug cleaner and/or spot remover for a wide variety of types of carpets (e.g., wool, nylon, silk, and the like), or other fiber-containing material. Further, the dye-leveling composition is suitable for use not only in acid dye baths, but also in neutral pH or basic pH dye baths, such as emulsion dyestuffs.

Component (a), the piperazine-substituted organosulfonate, is suitably produced by reacting, for example, an aralkyl ether sulfonic acid with a piperazine compound. Particularly advantageous aralkyl ether sulfonates are those selected from the group consisting of alkylated diphenyl oxide sulfonates having at least one alkyl-substitution on a phenyl ring and wherein said alkyl-substitution is selected from the group consisting of linear, branched, and cyclic alkyl substitutions, and combinations thereof. Although any piperazine compound can be used, preferred compounds include those selected from the group consisting of 1,2-aminoethyl piperazine, 1,4-piperazinediethane sulfonic acid, anhydrous piperazine, hydrated piperazine, and combinations thereof.

Particularly advantageous for use in preparing component (a) described above are the alkylated diphenyl oxide sulfonate anionic surfactants corresponding to the following formula or to a mixture of compounds corresponding to the following formula:

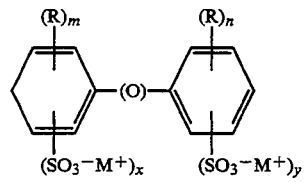

wherein each R is independently a saturated alkyl or substituted saturated alkyl radical or an unsaturated alkyl or substituted unsaturated alkyl radical each m and n is independently 0, 1 or 2; each M is independently hydrogen, an alkali metal, an alkaline earth metal, or ammonium or substituted ammonium; and each x and y are individually 0 or 1. Preferably, each R group is independently an alkyl group having from about 8 to about 24 carbon atoms, even more preferably about 10 to about 20 carbon atoms, and most preferably about 12 to about 16 carbon atoms, with 16 carbon atoms being especially preferred. The alkyl groups can be linear, branched or cyclic, with linear or branched radicals being preferred. The M+ ammonium ion radicals are of the formula $(R')_3NH+$ wherein each R' is independently hydrogen, a $C_1$-$C_4$ alkyl or a $C_1$-$C_4$ hydroxyalkyl radical. Illustrative $C_1$-$C_4$ alkyl or hydroxyalkyl radicals include methyl, ethyl, propyl, isopropyl, butyl, hydroxymethyl and hydroxyethyl. Typical ammonium ion radicals include ammonium ($N+H_4$), methylammonium ($CH_3N+H_3$), ethylammonium ($C_2H_5N+H_3$), dimethylammonium (($CH_3)_2N+H_2$), methylethylammonium ($CH_3N+H_2C_2H_5$), trimethylammonium (($CH_3)_3N+H$) dimethylbutylammonium (($CH_3)_2N+HC_4H_9$) hydroxyethylammonium ($HOCH_2CH_2N+H_3$) and methylhydroxyethylammonium ($CH_3N+H_2CH_2CH_2OH$). Preferably, each M is hydrogen, sodium, calcium, potassium or ammonium.

Alkylated diphenyl oxide sulfonates and their methods of preparation are well-known and reference is made thereto for the purposes of this invention. Representative methods of preparation of sulfonates are disclosed in U.S. Pat. Nos. 3,264,242; 3,634,272; and 3,945,437. Commercial methods of preparation of the alkylated diphenyl oxide sulfonates generally do not produce species which are exclusively monoalkylated, monosulfonated, dialkylated or disulfonated. The commercial available species are predominantly (greater than 90 percent) disulfonated and are a mixture of mono- and dialkylated with the percentage of dialkylation being about 15 to about 25 and the percentage of monoalkylation being about 75 to 85 percent. Most typically, the commercially available species are about 80 percent monoalkylated and 20 percent dialkylated.

Two illustrative commercially available solutions containing alkylated diphenyl oxide sulfonate surfactants are DOWFAX® 8390 and DOWFAX® 8390A surfactants, trademarked products of The Dow Chemical Company. In each, the alkyl group R is predominantly a hexadecyl ($C_{16}$) group. DOWFAX® 8390A typically contains about 25 percent of the acid forms of the surfactant, that is, in which M is hydrogen. DOWFAX® 8390 surfactant typically contains about 35 percent of the sodium salts of the surfactant, that is, in which M is sodium. DOWFAX® 8390A solution fully or partially neutralized with ammonium hydroxide is also suitable for use in the present invention.

The alkylated diphenyl oxide sulfonate compound is suitably reacted with the piperazine compound to produce the desired piperazine salt using a molar ratio of sulfonate compound to piperazine compound of between about 10:1 and about 1:10, preferably between about 2:1 and about 1:2.

Component (b), namely the organic or inorganic salt of a polycarboxylated alcohol alkoxylate is preferably selected from the group consisting of organic or inorganic salts of the following: polycarboxylated linear alcohol alkoxylates, polycarboxylated branched alcohol alkoxylates, polycarboxylated cyclic alcohol alkoxylates, and combinations thereof. Suitable polycarboxylated alcohol alkoxylates are shown by the empirical structural formula:

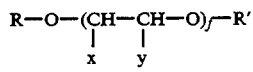

wherein R is a hydrocarbon radical having between about 6 and about 18 carbon atoms, R' is hydrogen or a hydrocarbon between 1 and 8 carbon atoms, x and y are independently selected from the group consisting of hydrogen, methyl, and succinic acid radicals, with the proviso that at least one x or y per molecule is a succinic acid radical, and f is between 1 and 25. Preferred polycarboxylated alcohol alkoxylates are those having a backbone containing both poly(propylene oxide) and poly(ethylene oxide) blocks, and such preferred polycarboxylated alcohol alkoxylates are readily commercially available, for example, under the registered trademark POLY-TERGENT CS-1 surfactant, a product of Olin Corporation. Any of a wide variety of inorganic or organic bases can be utilized to neutralize at least a portion of the acid groups on the polycarboxylated alcohol alkoxylate to provide the desired salt thereof, such as for example alkali metal hydroxides, alkaline earth metal hydroxides, and metal-free hydroxides, including potassium hydroxide, ammonium hydroxide, calcium hydroxide, magnesium hydroxide, ammonia, mono-, di- and tri-ethanol amines, and combinations thereof, Sodium hydroxide is preferred, and although potassium hydroxide can be employed, it is not preferred. The organic or inorganic base is preferably employed in at least an equimolar amount relative to the number of moles of polycarboxylated alcohol alkoxylate used. The polycarboxylated alcohol may also contain a polycarboxylic acid, for example, polyacrylic acid, along with the starting alcohol alkoxylate and esters of the alkoxylate and the said polycarboxylic acid.

Component (c), namely the alcohol alkoxylate, is suitably selected from a wide range of such compounds, as disclosed, for example, in U.S. Pat. No. 3,956,401. Illustrative linear alcohol alkoxylates are shown by the formula:

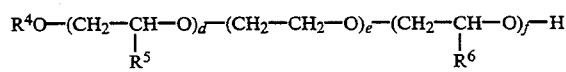

wherein
$R^4$ is a linear, alkyl hydrocarbon having, for example, an average of from about 7 to about 10 carbon atoms, $R^5$ is a linear, alkyl hydrocarbon of about 1 to about 4 carbon atoms, $R^6$ is a linear, alkyl hydrocarbon of about 1 to about 4 carbon atoms, d is an integer of about 1 to about 6, e is an integer of about 4 to about 15, and f is an integer of about 4 to about 25.

Useful linear alcohol alkoxylates are commercially available, for example, under the registered trademark POLYTERGENT SL-42, a product of Olin Corporation. If desired, the alcohol alkoxylate is suitably endcapped with a lower alkyl group, and such a product is commercially available as POLY-TERGENT SLF-18, a propylene oxide capped linear alcohol alkoxylate that is also a product of Olin Corporation, and these endcapped linear alcohol alkoxylates have been found by the present inventors to provide desirably low foaming during use. Also advantageous for use in accordance with the present invention is a surfactant within the group commercially available as POLY-TERGENT SLF-18B series surfactants, which are surfactants characterized by enhanced biodegradability and are also products of Olin Corporation, which are alkene oxide capped linear alcohol alkoxylates, containing ethylene oxide moieties in the backbone, and suitably also containing at least one propylene oxide moiety in the backbone, as disclosed, for example, in U.S. Pat. Nos. 4,925,587 and 4,898,621. Use of the POLY-TERGENT SLF-18 and/or POLY-TERGENT SLF-18B surfactants to comprise component (c) in accordance with the present invention has been by the present inventors to avoid the need for an antifoaming agent in the concentrates and working compositions of the present invention.

Nonionic surfactants useful as component (c) or as precursors prior to polycarboxylation to make component (c) include Tergitol XL-80N surfactant, a trademarked product of Union Carbide Chemicals and Plastics Technology Corp., Danbury, Conn. Tergitol XL-80N is a mixture of $C_8$–$C_{10}$ ethoxylated and propoxylated primary alcohols having an average molecular weight of approximately 420. The mixture decomposes rather than boils upon heating, and has a flash point of 425° F. (Cleveland open cup ASTM D 92.218 C). It has a freezing point of −3° C., a specific gravity of 0.98 at 20° C. and is a cloudy liquid which is fully soluble in water.

Another useful nonionic surfactant useful as component (c) is NEODOL® 91-6 surfactant, a trademarked surfactant product of Shell Chemical Company, Geismar, Louisiana. NEODOL® 91-6 surfactant is a detergent range mixture of $C_9$–$C_{11}$ linear primary alcohol ethoxylates having an average of 6 moles of ethylene oxide per mole of alcohol. NEODOL® 91-6 is a slightly viscous liquid having a pour point of 45° F. and a melting point of 42°–48° F. Its solubility in water is complete, although at high concentrations the product may form a gel with water. NEODOL® 91-6 surfactant contains less than 6 parts per million ethylene oxide. NEODOL® 91-6 surfactant possesses a hydroxyl number of 126–140 milligrams potassium hydroxide per gram.

While these surfactants are suitable for use as component (c) in the present invention, others within a wide range of molecular weights can also be successfully employed in aqueous or organic solvent solution. For example, surfactants with linear $C_9$–$C_{11}$ carbon chains and five or six EO or PO groups are expected to provide desirable results.

An antifoaming agent (also referred to herein as a "defoaming agent" or "defoamer") is optionally employed in accordance with the process of the present invention. The antifoaming agent is suitably incorporated into either the concentrate or the working composition in accordance with the present invention since foaming can sometimes occur either by virtue of agitation of the formulation during fiber dyeing or fiber cleaning with the "working" composition, or during dilution or mixing encountered during the preparation or use of the concentrate. The degree of foaming depends to a large extent upon the specific compounds selected for components (a), (b) and (c), as well as upon the physical method employed for fiber dyeing, fiber cleaning or concentrate dilution. Illustrative defoamers include silicon oils, mineral oils, modified alcohol ethoxylate, EO/PO block copolymers, phosphate ester, hydrophobic silica, and Fatty alcohols as well as blends of these defoamers. The antifoaming agent should be selected and employed at a concentration such that the detergency of the surfactant(s) and the corrosion inhibition of the 2-piperazinone are not unduly reduced. The antifoaming agent is desirably employed in the formulation at a concentration of 0.01 to 2 percent by weight, preferably at about 0.02 percent by weight. (Again, its concentration in the concentrate will be 5 to 20 times greater.) Other useful antifoaming agents include liquid silicone emulsions manufactured and sold by Dow Corning Corporation (Midland, Michigan) under its trademarks "DOW CORNING® X2-1410 ANTIFOAM" and "DOW CORNING® X2-2210 ANTIFOAM".

In accordance with the present invention, the fibers are either dye-leveled and dyed simultaneously from a single bath containing both the dye leveling agent and the dye, or the fibers can be pretreated with the dye-leveling agent prior to the dyeing step. The pH of the composition concentrates and the working compositions for dye-leveling can vary over a wide range, although pHs of between about 5 and about 9, preferably between about 6 and about 9, are particularly advantageous.

Although the dye-leveling agents of the present invention are suitably employed with a wide variety of dyes, they are particularly suitable for use in conjunction with acid dyes or dispersed dyes. The acid dyes are well-known in the art, and are also referred to herein as "acid dyestuffs". These acid dyes are typically applied to polyester fibers or polyamide-containing natural or synthetic fibers such as nylon, wool, and silk. Suitable fiber materials made from synthetic polyamide, which can be dyed using the process according to the invention, are, e.g., condensation products from hexamethylenediamine and adipic acid (Polyamide 6.6) or sebacic acid (Polyamide 6.10) or mixed condensation products, e.g. from hexamethylenediamine, adipic acid and E-caprolactam (Polyamide 6.6/6), also the polymerization products from E-caprolactam, known under the tradenames of Polyamide 6, "Perion" "Grilon" or "Enkalon" or w-aminoundecanoic acid (Polyamide 11 or "Rilsan"). These fibers can be treated with the compositions of the present invention at any stage of processing, that is to say, e.g. in the form of threads, yarns, knitted goods, and fabrics.

The dye-leveling composition (also referred to herein as the "dye-leveling agent") useful in accordance with the present invention is typically applied to the fiber in a "dye-leveling effective amount". As used herein, the term "dye-leveling effective amount" designates an amount sufficient to provide an even dye appearance on the fiber upon application of dye to the fiber. Preferably, the dye-leveling agent is applied to the fiber in an amount of between about 0.5 and about 5 weight percent (preferably between about 1 and about 4 weight percent) based upon the total weight of the goods being dyed.

The dye-leveling agent of the present invention is suitably employed in the presence or absence of a solvent. Suitable solvents, if used, include alcohols, glycol or ether, such as methanol, butanol, diethylene glycol, tetrahydrofuran, or propylene glycol monoethyl ether or the like. If used, the solvent is employed in an amount of between 10 and about 50 weight percent (preferably between 10 and 40 weight percent) based upon the total weight of the formulation.

Acid dyestuffs, suitable for use in accordance with the invention, can belong to very diverse classes of dyestuffs. These can be, for example, the commercially important dyestuff classes of the azo, anthraquinone, phthalocyanine, nitro, or formazane dyestuffs which can also contain metals bound in complex linkage such as copper, nickel, chromium, or cobalt. Suitable azo dyestuffs are, principally, monoazo dyestuffs, e.g. of the type phenylazobenzene, phenylazonaphthalene, phenylazohydrox- or aminopyrazoie, phenylazoacyloacetyl-arylamide, or those of the analogous naphthylazo series, whereby the aromatic nuclei can be suitably substituted. Also suitable are bis- and polyazo dyestuffs. The azo dyestuffs, to which also belong the formazane dyestuffs, can be metallized, principally by chromium or cobalt, but also by copper or nickel, whereby 1 or 2 dyestuff molecules per metal ion participate in the complex.

Typically, the acid dye is utilized in a "dye effective amount", i.e., an amount sufficient to cause a desired coloration of the fiber. Preferably, the acid dye is used in an amount of between about 0.1 and about 10.0 weight percent, based upon the total weight of the goods.

The reaction conditions employed in fabricating the compositions and composition concentrates of the present invention and the present process should not be limited to any particular conditions. It is preferred to carry out the reaction steps at a temperature of between about 25° C. and about 150° C. Reaction pressure can be selected as desired. Typically, super- or sub-atmospheric reaction pressure is not necessary for the reactions employed in the processes of the present invention. Atmospheric pressure is preferred in order to avoid the expense of special reaction vessels. However, elevated pressures can be used, if desired, and these superatmospheric pressures of up to 10 atmospheres or higher are suitably utilized if desired.

The following examples are intended to illustrate, but in no way limit the scope of, the present invention.

EXAMPLE 1

Preparation of a Dye-Leveling Composition

A high speed, high torque mixer (a Premier Cafcamo high intensity mixer) was employed at a mixing speed of between 500 and 1,000 rpm to blend a premixed blend consisting of 40 grams of Poly-Tergent® 2A1 acid (Alkyl diphenylether disulfonate acids), 3.91 grams of water, and 8.04 grams of 1,2 (Aminoethyl) piperazine neutralized with POLY-TERGENT 2A1 acid to pH of 6, then the blend was mixed in the high torque mixer until it was totally homogeneous. The resulting "intermediate blend" contained 77 percent of solids on a dry-weight basis.

The same high torque mixer was used at a mixing speed of between 500 and 2,000 rpm to mix 7,136 grams of POLYTERGENT CS-1 acid (polycarboxylated linear alcohol alkoxylate) into 21,407 grams Poly-Tergent® SL 42 (linear alcohol alkoxylate) until the mixture was a solution. To this solution was added 40 grams of the above-mentioned intermediate blend and 0.7196 grams of a defoamer silcon oil, and the resulting blend was mixed until it was totally homogeneous. Following homogenizing, 2,106 grams of 50% NaOH was added to neutralize the POLY-TERGENT CS-1 acid and the resulting mixture was mixed for 20 minutes to provide a final blend. The final blend was tested using the Barre', Transfer and Wetting tests described hereinbelow. The performance of the final blend demonstrated good dye-leveling, transfer and wetting against the standard comparison, which consisted of POLY-TERGENT 2A1 alone.

Additional final blends were also prepared using an identical procedure to that described above, but wherein the "intermediate blend" had 68.9 percent solids (run #2) or a 55.0 percent solids (run #3) on a dry weight basis. The performance of the final blends from run #2 and run #3 demonstrated good dye-leveling, transfer and wetting against the standard comparison, which consisted of POLY-TERGENT 2A1 surfactant alone.

Another final blend was prepared using identical methodology to that described above, but substituting POLYTERGENT SLF-18 surfactant in place of the POLY-TERGENT SL 42 and without using a defoamer. The results showed that a low foaming final blend was provided with no need for a defoamer.

A variety of other industry-accepted dye-leveling performance, spot removal performance, and carpet cleaning tests (as described in detail hereinbelow) were performed using the final blends prepared above in order to evaluate the efficacy of these blends as dye-leveling agents for nylon fibers and for polyester fibers, as well as for applications in carpet cleaning and spot removal. The compositions of the present invention provided excellent performance against the standard (POLY-TERGENT 2A1 surfactant alone) and a modified standard additionally used for some of the tests (POLY-TERGENT 2A1 surfactant plus dioctyl sulfosuccinate (referred to hereinafter as "DOS")).

For convenience, the compounds of the present invention are also referred to herein as "ADL-Ultra-A" or "ADL-ULTRA L-A", whereas the comparison example compounds are referred to as "2A1" or "2A1/DOS".

PERFORMANCE TESTING AND RESULTS PROVIDED:

The following procedures which were performed to evaluate the dye levelling agent in textile applications (Procedures 1 thru 5) utilize the HunterLab Color-QUEST 45/0 Spectrocolorimeter to determine lightness on fabric. Lightness, which may also be expressed as percent transmittance or reflectance, will be expressed as L value. The following criteria define the mode of color specification:

| Specifications | |
| --- | --- |
| Scale | Hunter Lab |
| Observer Angle | 10 degrees |
| Illuminant | D65 |
| Geometry | Reflectance 45/0 |
| # of Readings | Defined individually |

Procedure #1—Barre' Test—Description of the Test Used

A 10 gram swatch of Tiger cloth is processed in a dye bath with a 40:1 liquor to goods ratio containing 0.12% Tectilon Blue 4RS, 0.12% Tectilon Red 2 BN, 0.18% Tectilon Orange 3G, 0.2% ammonium sulfate, and the dye levelling formulation at a 2% level. The dye bath is adjusted to pH 6 and heated at 1 degree Celsius per minute. The dye bath is then held at the boiling point for 30 minutes. After drying, sample measurements were obtained for lightness (L Value) on the HunterLab ColorQUEST 45/0 Spectrocolorimeter. A total of 6 readings each were averaged on both the dark band and the light band of the Tiger cloth. A ratio comparing the average L Value of the light band to the average L Value of the dark band gave the following results:

| ADL-Ultra-A | 2A1 |
| --- | --- |
| 1.004 | 1.003 |

A ratio of 1.00 represents equal dye spread across the swatch. The above ratios indicate comparable performance in the evenness of dyespread for the dye levelling formulation versus 2A1 across a series of heat settings in Tiger cloth.

Procedure #2—Transfer Test

A 6 gram swatch of Nylon 6,6 carpet is processed in a dye bath with a 40:1 liquor to goods ratio containing 0.36% Tectilon Blue 4RS, 0.36% Tectilon Orange 3G, 0.30% Tectilon Red 2 BN, 0.2% ammonium sulfate, and no dye levelling agent. The dye bath is adjusted to pH 6 and heated at 1 degree Celsius per minute. The dye bath is held for 1 hour at the boiling point. The sample is dried in a 50 degree Celsius oven. An undyed swatch is cut to the weight of the original (dried) swatch and along with the original swatch is placed in a second bath containing 0.2% ammonium sulfate and the dye levelling formulation at a 2% level. The dye bath is adjusted to pH 6, heated at 1 degree Celsius per minute, and held for 1 hour at the boiling point. After drying, samples are measured for lightness on the HunterLab ColorQUEST 45/0 Spectrocolorimeter. A total of five readings were made on each swatch. The following values are ratios of the original to the final swatch to provide a comparison between the dye levelling formulation and 2A1:

| ADL-Ultra-A | 2A1 |
|---|---|
| 0.936 | 0.942 |

A value of 1.000 represents equal transfer from the original to the final swatch. The above ratios reveal that the dye levelling formulation is competitive with of the POLY-TERGENT 2A1 surfactant alone with respect to performance in equal dye transfer onto Nylon 6,6 carpet.

Procedure #3—Exhaust Test on Nylon Fibers

Ten gram swatches of Nylon 6,6 and Nylon 6 carpet are each processed in separate dye baths with a 40:1 liquor to goods ratio containing 0.36% Tectilon Blue 4RS, 0.36% Tectilon Orange 3G, 0.30% Tectilon Red 2 BN, 0.2% ammonium sulfate, and 2% dye levelling agent. The dye baths are adjusted to pH 6, then heated at 1 degree Celsius per minute and held for 1 hour at the boiling point. After boiling, the weight of the dye baths are readjusted to the original weights to restore the initial concentration. Dye bath samples are investigated by Flow Injection Analysis, with the resulting data analyzed by Chemometric techniques to report a breakdown of the dye components left in the dye bath. The following data is quantitative for all dye components giving the total dye from each dye bath reported in mg/gm:

|  | ADL-Ultra-A | 2A1 |
|---|---|---|
| Nylon 6,6 | 2.61 | 3.12 |
| Nylon 6 | 2.06 | 2.30 |

The above values for total dye remaining after processing indicate that the dye levelling agent of the present invention performs more effectively on this test for dye exhaustion than does POLY-TERGENT 2A1 surfactant alone.

Procedure #4—Shade Depth—Appearance of Dye on Fibers.

Processing is followed according to Procedure #3. Swatches are evaluated for lightness on a HunterLab ColorQUEST 45/0 Spectrocolorimeter. Five readings for lightness are made across the center of the swatch in each of four directions. These twenty values are averaged to obtain an L value that indicates the depth of penetration of the dye. The following results are L values comparing the dye levelling agent versus 2A1 for performance in dye penetration:

|  | ADL-Ultra-A | 2A1 |
|---|---|---|
| Nylon 6,6 | 20.59 | 21.38 |
| Nylon 6 | 20.42 | 21.11 |

The above values indicate that the dye levelling agent of the present invention gives better penetration of the dye into the fiber than POLY-TERGENT 2A1 surfactant alone (the standard comparison). This is an indication of more uniform coloring and evenness of shade from the edge to the center of the fiber being provided by the compositions of the present invention.

Procedure #5—Strike Rate—Measurement of Color Dye Adsorption onto Nylon Fiber.

Following this procedure, six gram swatches of nylon 6,6 carpet are processed in a series of dye baths with a 40:1 liquor to goods ratio containing the following dyes: 0.36% Tectilon Blue 4RS, 0.36% Tectilon Orange 3G, 0.30% and Tectilon Red 2 BN dyes, 0.2% ammonium sulfate and 2% of the dye levelling agent produced following the procedure of Examples 1-3 above. Each dye bath is adjusted to pH 6 and heated at 1 degree Celsius per minute. When the initial bath reaches 80 degrees Fahrenheit, the swatch is removed, followed by the removal of swatches from the remaining baths at successive 10 degree Fahrenheit intervals. The final bath is allowed to boil for one hour before the removal of the swatch. After drying, all samples were measured for lightness on a HunterLab ColorQUEST 45/0 spectrocolorimeter. A total of nine readings were made for each swatch and averaged.

The following data indicates performance for lightness in the rate of dye strike as evidenced by average L (i.e., light reflection) values where the dye levelling formulation is contrasted with 2A1 and a standard composed of a 2:3 ratio of 2A1 to sodium dioctyl sulfosuccinate:

| | L values | | |
|---|---|---|---|
| Temp | ADL-Ultra-A | 2A1 | 2A1/DOS |
| 80° F. | 59.64 | 56.05 | 58.51 |
| 90° F. | 45.65 | 47.78 | 51.71 |
| 100° F. | 39.82 | 41.22 | 43.16 |
| 110° F. | 34.09 | 35.94 | 37.72 |
| 120° F. | 29.98 | 30.42 | 31.73 |
| 130° F. | 25.85 | 26.88 | 28.40 |
| 140° F. | 22.96 | 21.83 | 24.05 |
| 150° F. | 20.71 | 19.57 | 22.54 |
| 160° F. | 17.53 | 18.59 | 21.59 |
| 170° F. | 17.09 | 16.42 | 17.65 |
| 180° F. | 16.17 | 16.66 | 16.97 |
| Boil | 16.70 | 15.70 | 16.25 |

The following data indicates performances in the rate of dye strike for red-to-green color as evidenced by average "a" values:

| | "a" values | | |
|---|---|---|---|
| Temp | ADL-Ultra-A | 2A1 | 2A1/DOS |
| '80° F. | 3.88 | 6.81 | 5.80 |
| 90° F. | 5.13 | 6.76 | 6.17 |
| 100° F. | 4.92 | 6.54 | 6.36 |
| 110° F. | 4.46 | 6.02 | 6.05 |
| 120° F. | 4.21 | 5.28 | 5.43 |
| 130° F. | 3.86 | 4.78 | 5.06 |
| 140° F. | 3.63 | 4.07 | 4.35 |
| 150° F. | 3.41 | 3.64 | 3.93 |
| 160° F. | 3.50 | 3.25 | 3.77 |
| 170° F. | 3.37 | 3.32 | 3.47 |
| 180° F. | 3.47 | 3.48 | 3.66 |
| Boil | 3.71 | 3.58 | 3.90 |

The following data indicates performances in the rate of dye strike for yellow to blue color as evidenced by average "b" values:

| | "b" values | | |
|---|---|---|---|
| Temp | ADL-Ultra-A | 2A1 | 2A1/DOS |
| 80° F. | 6.84 | 9.17 | 9.48 |
| 90° F. | 6.37 | 9.06 | 9.04 |

-continued

| | "b" values | | |
|---|---|---|---|
| Temp | ADL-Ultra-A | 2A1 | 2A1/DOS |
| 100° F. | 6.30 | 8.49 | 8.66 |
| 110° F. | 6.03 | 8.06 | 8.31 |
| 120° F. | 5.69 | 7.46 | 7.73 |
| 130° F. | 5.61 | 6.96 | 7.30 |
| 140° F. | 5.21 | 5.89 | 6.43 |
| 150° F. | 4.94 | 5.26 | 5.94 |
| 160° F. | 4.61 | 4.53 | 5.89 |
| 170° F. | 4.22 | 4.23 | 4.69 |
| 180° F. | 4.14 | 4.27 | 4.22 |
| Boil | 4.24 | 4.11 | 3.98 |

The above data gives evidence to various trends regarding initial dye take-up or adsorption by the fiber. "A" values are greater for 2A1/DOS than the dye levelling agent. This implies that the red dye is being absorbed first. Since red dye has a weaker charge this indicates that 2A1 and 2A1/DOS possess a weaker tendency to retard red dye initially. "B" values for 2A1 and 2A1/DOS tend towards yellow, whereas, the dye levelling agent shows a greater tendency towards blue. The blue dye is higher charged, and the data implies that the dye levelling agent possesses the characteristic of retarding the lower potential charged species and bringing out the dye shade more evenly.

Procedure #6—Draves Wetting Test

Evaluation of the wetting property for the dye levelling agent was made according to ASTM D2281-68 (Reapproved 1986). One gram of the dye levelling agent per 500 mL of distilled water was thoroughly mixed in a graduated cylinder. A 3 gram hook was hung on a Nylon 6,6 skein and dropped into the cylinder. Time measurement (in seconds) was started as the skein was released into the solution and stopped when the skein definitely began to sink. Determinations were made in seconds at 75, 120, and 160 degrees Fahrenheit for the dye levelling agent against 2A1 and are listed as follows:

| | ADL-Ultra-A | 2A1 | 2A1/DOS |
|---|---|---|---|
| 75° F. | 3.7 | 12 | 2.7 |
| 120° F. | 0 | 0 | 0 |
| 160° F. | 0 | 0 | 0 |

The above wetting data indicates that the dye levelling agent of the present invention provides quick wetting in a short time that is competitive with an industry standard (2A1/DOS).

Procedure #7—Blender Foam Heights

Determination of foaming properties was made by the use of a Waring Commercial Blender. One gram of the dye levelling agent per 500 mL of distilled water was mixed thoroughly and blended for 30 seconds at 22,000 rpm. Measurements were made in centimeters from the original height of the solution to the top of the foam at initial, 1,3, and 5 minute intervals. A comparison of foam height between the dye levelling agent, 2A1, and 2A1/DOS (2:3) are listed as follows:

| 75° F. Run | ADL-Ultra-A | 2A1 | 2A1/DOS |
|---|---|---|---|
| Initial | 8.25 | 10.00 | 10.00 |
| 1 Minute | 8.25 | 10.00 | 10.00 |
| 3 Minutes | 7.10 | 9.50 | 10.00 |
| 5 Minutes | 6.35 | 9.50 | 10.00 |
| 160° F. Run | ADL-Ultra-A | 2A1 | 2A1/DOS |
| Initial | 8.70 | 10.00 | 10.00 |
| 1 Minute | 8.50 | 10.00 | 10.00 |
| 3 Minutes | 6.65 | 9.50 | 10.00 |
| 5 Minutes | 5.70 | 9.50 | 10.00 |
| 120° F. Run | ADL-Ultra-A | 2A1 | 2A1/DOS |
| Initial | 8.25 | 10.00 | 10.00 |
| 1 Minute | 7.40 | 10.00 | 10.00 |
| 3 Minutes | 5.85 | 10.00 | 10.00 |
| 5 Minutes | 4.90 | 8.70 | 10.00 |

The above results indicate that the dye levelling agent of the present invention has the characteristic of being lower foaming as compared to the tested industry standards at all three temperatures tested.

Procedure #8—Surface Tension Measurement

Evaluation of the static and interfacial tension of the dye leveling agent was determined according to ASTM D1331-56 (Reapproved 1986) on a Fisher autotensionmat ®. Sample concentration was 2 grams per liter in distilled water. The second phase component used for the determination of interfacial tension was mineral oil. The following results comparing the dye levelling agent versus 2A1 and 2A1/DOS are reported in dynes/cm:

| | ADL-ULTRA L-A | 2A1 | 2A1/DOS |
|---|---|---|---|
| Static | 30.6 | 33.6 | 33.5 |
| Interfacial | 0.8 | 4.5 | 5.8 |

A series of concentrations of ADL-Ultra-A was prepared, at 100 ppm through 10,000 ppm. The interfacial tension was measured. The following results are listed below:

| Interfacial Tension Values for ADL-Ultra-A at Various Concentrations | |
|---|---|
| ADL-Ultra-A | Interfacial Tension |
| 100 ppm | 4.4 |
| 200 ppm | 2.5 |
| 500 ppm | 1.2 |
| 1000 ppm | 1.3 |
| 2000 ppm | 1.3 |
| 5000 ppm | 1.4 |
| 10000 | 1.2 |

| Interfacial Tension Values for SL-42 & CS-1 Salt at Various Concentrations | |
|---|---|
| | Interfacial Tension |
| SL-42 | |
| 500 ppm | 4.9 |
| 1000 ppm | 3.3 |
| 5000 ppm | 1.9 |
| CS-1 | |
| 500 ppm | 9.1 |
| 1000 ppm | 7.5 |
| 5000 ppm | 4.1 |

Surface tension results indicate that the dye leveling agent of the present invention enhances both the hydrophilic (static) and the hydrophobic (interfacial) interaction with water. Therefore, the dye levelling agent improves the ability to provide for a more uniform balance between hydrophobic and hydrophilic wetting. Low interfacial tension indicates an enhanced ability to clean fiber carpets spot on carpets and any other fiber material related. The above data demonstrates the enhanced low interfacial tension with a low critical micille concentration ("CMC") value for the composition of the present invention, as compared to the industry standard comparisons tested.

Procedure #9—Storage Stability Measurement

The dye levelling agent was evaluated for storage stability under ambient, elevated temperature, and freeze/thaw conditions. Ambient conditions are defined by 22 degrees Celsius at 50% relative humidity. Elevated temperature is defined by 40 degrees Celsius within a range of 4 degrees (plus or minus) Celsius. Freeze/thaw conditions are defined by 5 cycles of 16 hours at −20 degrees Celsius followed by 8 hours at ambient conditions. The following observations were reported for the performance of the dye levelling agent under the specified conditions:

| ADL-Ultra-A | |
|---|---|
| Ambient | Stable |
| 40° C. | Stable |
| Freeze/Thaw | Stable |

The dye levelling agent of the present invention exhibits good storage stability at all environmental conditions. The components of the blend are compatible with each other to maintain a homogeneous and smooth-flowing product.

Procedure #10—Carpet Cleaning

The Carpet Cleaning agent was evaluated for efficacy. Cleaning properties was made by the use of a modify AATCC Test Method 171-1989 (Carpet Cleaning of Hot (Steam) Extraction Method). Briefly this test procedure involves following: 1) Secure the specimen to the floor or mounting board with staples, tacks or the suitable method. 2) Prepare the cleaning solution according to the directions supplied. 3) Pour 8 liters (2 gallons) or more of cleaning solution preheated to 60° C (140° F.) into the empty solution tank. 4) Purge the system of cold cleaning solution before beginning each cleaning cycle. 5) With water-feed spray and vacuum on and the cleaning head in contact with the carpet surface, draw the cleaning head across the surface on the carpet in a direction opposite to the lay of the pile. With out changing the position of the carpet, place the cleaning head in the same starting position of the carpet surface as before land with only the vacuum on (water-feed spray off) draw the cleaning head across the same area of the carpet as in the first pass. These two passes of the cleaning head constitute one cleaning cycle. In most cases, two cleaning cycles will be necessary to obtain measurable results. However the number of cycles may be increased depending on the degree of soiling and the purpose of the test. This test method was modified in the following way for the purpose of evaluation. One gram of the ADL Ultra-A agent per 1000 mL of distilled water was mixed thoroughly and heated to a temperature of 60° C (140° F)- The solution was applied with a brush to a heavily soiled carpet with an area of 12 by 12 inches. The carpet brush was passed five times over the carpet with solution in one direction and five times at 90 degrees and then left to soak for five to ten minutes. After soaking of the carpet a cloth rag was wet with 40° C. water and past over the carpet five times to remove the solution cleaner. The carpet was air dried and showed an enchanted cleaning of the carpet Procedure #11—Carpet Spot Remover The Carpet Spot Remover agent was evaluated for efficacy. Cleaning properties was made by the use of a modify AATCC Test Method 171-1989 (Carpet: Cleaning of; Hot (Steam) Extraction Method) described in the example 4. This test method was modified in the following way for the purpose of evaluation. One gram of the ADL Ultra-A agent per 1000 mL of distilled water was mixed thoroughly and heated to a temperature of 60° C. (140° F.). The solution was applied both at room temperature and at 60° C. (140° F.) with brush to a heavily soil spot on the carpet with area of 4 by 4 inches. The carpet brush was passed five times over the carpet with solution in one direction and five times at 90 degrees and then left to soak for five to ten minutes. After soaking of the carpet a cloth rag was wet with 40° C. water and passed over the carpet five times to remove the solution cleaner. The carpet was air dried and showed excellent cleaning by removal of the spot from the carpet when using the composition of the present invention.

Procedure #12—Exhaust Test on Polyester Fibers

The following procedure, which was performed to evaluate the dye levelling agent on polyester fabric, utilizes the HunterLab ColorQUEST 45/0 Spectrocolorimeter to determine lightness on fabric. Lightness, which may also be expressed as percent transmittance or reflectance, will be expressed as L value. The following criteria define the mode of color specification:

| SPECIFICATIONS | |
|---|---|
| Scale | Hunter Lab |
| Observer Angle | 10 degrees |
| Illuminant | D65 |
| Geometry | Reflectance 45/0 |
| # of Readings | 12 per sample |

Exhaust Test Methodology

Ten gram swatches of polyester carpet are processed in dye baths with a 40:1 liquor to goods ratio containing 0.22% Dianix Yellow RG 200 (1% solution) and 2% dye leveling agent. The dye baths are adjusted to pH 5.5, and then heated at 1 degree Celsius per minute. One set is heated to 150 F. and held at temperature for one hour, and another set is heated to the boiling point and held for 1 hour. The swatches are evaluated for lightness and yellowness where 3 readings are made across the center of the swatch in each of four directions. The twelve readings are averaged to obtain an L value which indicates the depth of penetration of the dye and a "b" value which indicates the degree of yellowness. The following results compare the dye leveling agent versus a competitor (Pomoco 1437), a nonionic (S-305LF), and a proprietary product (ADL-W):

| Reflectance Values for Polyester Dyeing with Dianix Yellow RG 200 | | | |
|---|---|---|---|
| | | L Value | b Value |
| ADL-Ultra-A | 150 F. | 72.36 | 39.24 |
| Pomoco 1437 | 150 F. | 71.45 | 39.99 |
| ADL-Ultra A | Boil | 69.07 | 40.60 |
| Pomoca 1437 | Boil | 70.37 | 40.68 |

-continued

| Reflectance Values for Polyester Dyeing with Dianix Yellow RG 200 | | | |
|---|---|---|---|
| | | L Value | b Value |
| S-305 LF | Boil | 71.52 | 40.70 |
| ADL-W | Boil | 71.55 | 41.30 |

Reflectance values indicate competitive efficacy for coldstaining at 150 F. and a small improvement at boil for the dye leveling agent on polyester fabric.

What is claimed is:

1. A composition concentrate comprising:
  (a) a piperazine-substituted organosulfonate,
  (b) an organic or inorganic salt of a polycarboxylated alcohol alkoxylate, and
  (c) an alcohol alkoxylate,
wherein the amount of component (a) is between about 20 and about 75 weight percent, component (b) is present in an amount of between about 2.5 and about 25 weight percent, and component (c) being between about 10 weight percent and 75 weight percent, all weight percents being based upon the weight of said composition concentrate.

2. The composition concentrate of claim 1 wherein said piperazine-substituted organosulfonate is produced by reacting an aralkyl ether sulfonic acid with a piperazine compound selected from the group consisting of 1,2-aminoethyl piperazine, 1,4-piperazinediethane sulfonic acid, anhydrous piperazine, hydrated piperazine, and combinations thereof.

3. The composition concentrate of claim 2 wherein said aralkyl ether sulfonic acid is selected from the group consisting of alkylated diphenyl oxide sulfonic acid having at least one alkyl-substitution on a phenyl ring and wherein said alkyl-substitution is selected from the group consisting of linear, branched, and cyclic alkyl substitutions, and combinations thereof.

4. The composition concentrate of claim 1 wherein said polycarboxylated alcohol alkoxylate is selected from the group consisting of polycarboxylated linear alcohol alkoxylates, polycarboxylated branched alcohol alkoxylates, polycarboxylated cyclic alcohol alkoxylates, and combinations thereof.

5. A composition comprising water and the concentrate of claim 1, said concentrate being present in said composition in an amount of between about 0.01 weight percent and about 20 weight percent, based upon the weight of said composition.

6. A method of dyeing a fiber which comprises contacting the fiber with the composition of claim 5 to provide a treated fiber having said composition adhering to the outer surface thereof, and simultaneously or subsequently contacting the fiber with a dye, thereby causing the dye to adhere evenly to the outer surface of said fiber.

7. A composition comprising:
  (a) the reaction product of a piperazine compound and an alkyl diphenyl ether sulfonic acid,
  (b) the reaction product of a base and a polycarboxylated linear alcohol alkoxylate acid, and
  (c) a linear alcohol alkoxylate.

8. The composition of claim 7 wherein said piperazine compound is selected from the group consisting of 1,2-aminoethyl piperazine, 1,4-piperazinediethane sulfonic acid, anhydrous piperazine, hydrated piperazine, and combinations thereof.

9. The composition of claim 7 wherein said alkyl diphenyl ether sulfonic acid is selected from the group consisting of alkylated diphenyl oxide sulfonic acid having at least one alkyl-substitution on a phenyl ring and wherein said alkyl-substitution is selected from the group consisting of linear, branched, and cyclic alkyl substitutions, and combinations thereof.

10. The composition of claim 7 wherein said polycarboxylated alcohol alkoxylate is selected from the group consisting of polycarboxylated linear alcohol alkoxylates, polycarboxylated branched alcohol alkoxylates, polycarboxylated cyclic alcohol alkoxylates, and combinations thereof.

11. A composition useful for dyeing fibers comprising (a) a dye and (b) a dye-leveling agent comprising:
  (1) the reaction product of 1,2-aminoethyl piperazine and an alkyl diphenyl ether sulfonic acid,
  (2) the reaction product of a base and a polycarboxylated linear alcohol alkoxylate acid, and
  (3) a linear alcohol alkoxylate,
said dye-leveling agent being present in a dye-leveling effective amount.

12. A process for preparing a dye-leveling composition which comprises the steps of:
  (a) reacting a piperazine compound selected from the group consisting of 1,2-aminoethyl piperazine, 1,4-piperazinediethane sulfonic acid, anhydrous piperazine, hydrated piperazine, and combinations thereof, with an aralkyl ether sulfonic acid to provide a piperazinesubstituted aralkyl ether sulfonate,
  (b) contacting said piperazine-substituted aralkyl ether sulfonate with a mixture comprising an alcohol alkoxylate and a polycarboxylated alcohol alkoxylate to provide a piperazine-containing mixture, and
  (c) neutralizing at least a portion of said polycarboxylated alcohol alkoxylate in said piperazine-containing mixture with an organic or inorganic base in order to form a salt of said polycarboxylated alcohol alkoxylate.

13. A fiber cleaning composition comprising (a) a base fluid medium comprising water or an organic solvent, or a combination thereof, and (b) a cleaning agent comprising:
  (1) the reaction product of a piperazine compound and an alkyl diphenyl ether sulfonic acid,
  (2) the reaction product of a base and a polycarboxylated linear alcohol alkoxylate acid, and
  (3) a linear alcohol alkoxylate.

14. A method of cleaning fibers which comprises contacting the fibers with the cleaning composition of claim 12.

* * * * *

UNITED STATES PATENT AND TRADEMARK OFFICE
CERTIFICATE OF CORRECTION

PATENT NO. : 5,360,457
DATED : November 1, 1994
INVENTOR(S) : Murray A. Ruggiero, Bruce A. Marien, Shoaib Arif, Robert P. Roth, Joseph T. Farrell, A. R. Vanover It is certified that error appears in the above-indentified patent and that said Letters Patent is hereby corrected as shown below:

At column 9, line 20 after "mix" delete "7,136", and insert --7.136-- in its place; line 21 after "of" delete "POLYTERGENT" and insert --POLY-TERGENT-- in its place; line 22 after "into" delete "21,407" and insert --21.407-- in its place; line 28 after "homogenizing," delete "2,106" and insert --2.106-- in its place; line 48 delete "POLYTERGENT" and insert --POLY-TERGENT-- in its place; and at line 49 delete "SL 42" and insert --SL-42-- in its place.

At column 14, line 4 delete "160°F." and insert --120°F.-- in its place and at line 9 delete "120°F." and insert --160°F.-- in its place.

Signed and Sealed this

Twenty-first Day of February, 1995

Attest:

BRUCE LEHMAN

Attesting Officer          Commissioner of Patents and Trademarks